July 17, 1956  H. HOPWOOD  2,754,814
LUBRICATION MEANS FOR INTERNAL COMBUSTION ENGINES
Filed Feb. 18, 1954
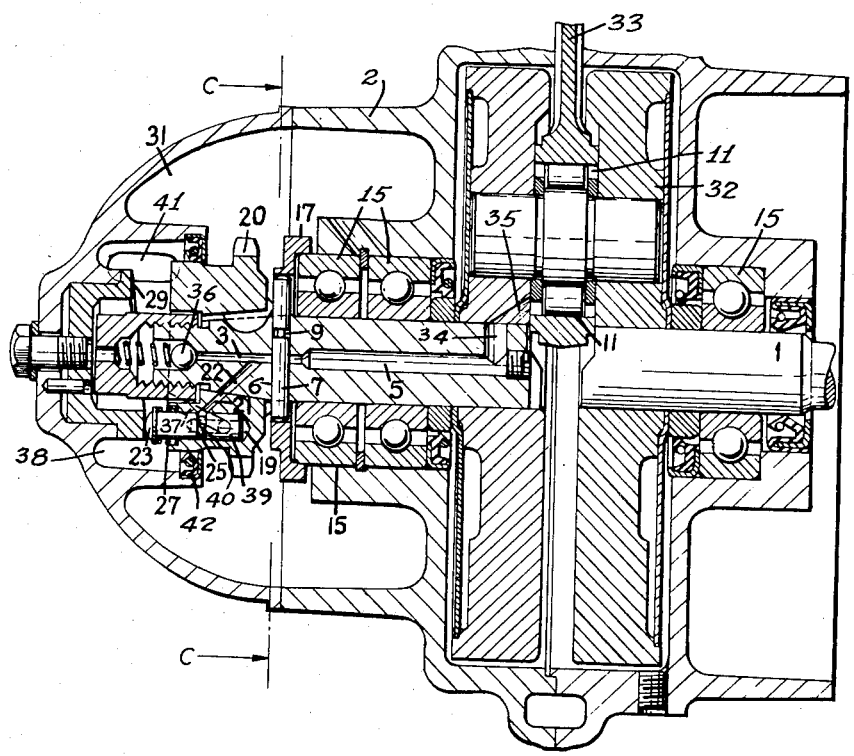
FIG./.
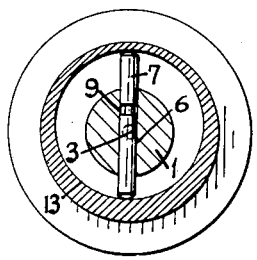
FIG.2.
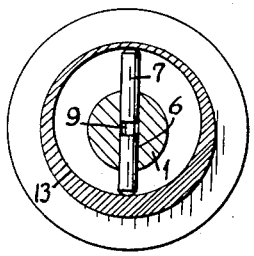
FIG.3.
Inventor
Herbert Hopwood
By Morris L. Bateman
Attorneys United States Patent Office 2,754,814
Patented July 17, 1956

2,754,814
LUBRICATION MEANS FOR INTERNAL COMBUSTION ENGINES

Herbert Hopwood, Birmingham, England, assignor to The Birmingham Small Arms Company Limited, Birmingham, England, a British company Application February 18, 1954, Serial No. 411,241

3 Claims. (Cl. 123—196)

This invention relates to internal combustion engines of the two-stroke type employing, as is usually the case, crankcase compression. The invention is particularly concerned with the lubrication of the big-end bearings, i. e. the bearing on the crankshaft on which the piston rod is mounted, and is particularly applicable to engines of the kind referred to adapted to be used in motor cycles.

An object of the invention is the provision of a simple means of controlling a supply of lubricant to the big-end bearings of engines of the type referred to and to prevent the use of excess quantities of lubricant.

According to this invention lubricant is fed, in engines of the type referred to, through a passage in the crankshaft leading to big-end bearings, in which passage is a valve comprising a plunger which is adapted to open and close the valve, one end of the plunger extending from the crankshaft in order to engage a stationary cam surface, so that on rotation of the crankshaft the plunger is, by engagement with the cam surface, moved into position to open and close the valve.

The lubricant is fed under pressure, desirably in predetermined amounts, during the time the gas in the crank-case is under compression, the valve referred to being open during the whole or a portion of the period of each cycle that the gases in the crank-case are under compression and closed during the period the gases are under suction.

If it is desired to employ the suction exerted by the engine to suck the lubricant to the big end bearings then, of course, the valve is arranged to be open during the whole or a portion of the period of each cycle that the gases in the crank-case are under suction, and closed during the whole or a portion of the period the gases are under compression.

The invention will now be particularly described with reference to the accompanying drawings in which:

Fig. 1 is a sectional end elevation of a part of a crank case lubricating control valve constructed in accordance with the invention:

Fig. 2 is a sectional end elevation on line CC in Fig. 1 of the lubricant control valve when in the closed position;

Fig. 3 is a sectional end elevation on line CC in Fig. 1 of the lubricant control valve when in the open position.

The crank-case 2 houses the crank-shaft 1 which is mounted in bearings 15. Mounted on the crank-shaft 1 is the crank 32 to which is connected the connecting rod 33, the big end bearing of the connecting rod being shown at 11, the other end of the connecting rod and also the usual reciprocating piston being omitted from the drawings.

A lubricant passage 5 is formed in the crank-shaft and leads to the big end bearing 11 through the passages 34 and 35 formed in the crank-shaft and crank, respectively, at one end of the passage 5. At the other end of the passage 5 there is provided an extension passage 3 of reduced diameter which is adapted to be closed by the ball valve 36.

Passing diametrically through the crank-shaft 1 and the extension passage 3 is a hole 6 in which is slidably mounted a plunger 7 which, at a suitable position, is recessed as shown at 9 for a distance along its length approximately equal to the diameter of the extension passage 3, as shown in Fig. 3. Thus, when the recess 9 in the plunger 7 is opposite the extension passage, the valve formed by the passage 3 and the plunger 7 is open and lubricant can pass through to the big-end bearing 11. When the plunger 7 is moved so that the recess 9 is moved away from the passage 3 and becomes opposite to a solid part of the crankshaft 1 the valve is closed and lubricant cannot pass. The plunger 7 in such a construction is preferably longer than the diameter of the crankshaft 1 and of sufficient length that both ends always protrude, to a greater or lesser degree, from the crankshaft 1.

The cam 17 which is in engagement with and controls the longitudinal movement of the plunger 7 is preferably of ring form with an internal cam or eccentric face 13 and preferably with both ends of the plunger 7 engaging therewith. By this arrangement the plunger 7 is positively moved in both directions. The cam ring 13 is mounted on and secured to the stationary part of one of the two adjacent anti-friction main bearings 15 for the crank-shaft 1.

Lubricant is preferably supplied under pressure as will be hereinafter described, by means of a lubricant pump, in a sprocket wheel 20, mounted on the end of the crank shaft 1, the hole 19 which forms a pressure chamber for the pump being eccentrically disposed in relation to the axis of the crank shaft 1. Extending from a position approximately mid-way of the length of the hole 19 is a radial passage 21 extending through the sprocket wheel 20 to the periphery of the crankshaft 1 and being in line with a further port 22 in the crankshaft 1. Also extending from the hole 19 is a further passage 37 which communicates with the space 38 around the end of the sprocket wheel 20. Slidably disposed within the hole 19 is fitted a spring-loaded plunger 23 which is suitably recessed at 25 so that in one position the recess 25 and radial passages 21 are in communication and in the other position they are out of communication. The plunger 23 is formed with a bore 39 which is connected to the space formed by the recess 25 by means of a hole 40. The outer end of the plunger 23 which may be suitably rounded, extends from the end of the sprocket wheel 20 and, under the action of its spring 27, is in engagement with a face cam 29 so that, as the crankshaft 1 rotates, the plunger 23 is moved over the cam and consequently is reciprocated within the hole 19 to open and close communication with the two passages 21 and 37 above referred to and to force oil which flows from the passage 37 into the hole 19 when the plunger 23 uncovers the passage 37, from the hole 19 along the passage 21. The operation of this pump is as follows: When the plunger 23 moves under the influence of the spring 27 in a direction out of the hole 19 it closes the passage 21 and uncovers the passage 37. Oil from the face of the sprocket wheel 20 in the space 38 flows along the passage 37 and into the hole 19. When the plunger 23 returns under the action of the cam 29 it closes the passage 37, applies pressure to the oil and then opens the passage through the hole 40 and passages 21, 22, 3 and 5 to the big end bearing 11. The face cam 29 is of any suitable form but may conveniently be of a form resembling a swash plate. While the face cam 29 is normally stationary when the device is working, it may be adjustable either angularly or axially, and such adjustment may be manual which may be carried out while the device is in operation or not, and/or automatic, an example of the latter being a control derived from the throttle mechanism or from a moving part of the engine so that when the engine is being driven with wide throttle openings or at high speeds a greater proportional supply of lubricant may be delivered to the big-end bearings.

The sprocket wheel 20 and its driving chain (not shown) are disposed in a chamber 31 containing a supply of lubricant, thus causing lubricant to be splashed around the chamber when the engine is in operation. The oil can pass through the space 41 into the space 38 where it is retained by the oil seal 42. Deflector plates may be employed to provide assistance in directing the lubricant to the passage 37. Alternatively, scoops, dipping into the lubricant may be employed.

Having thus described my invention, what I claim as new and desire to secure by Letters Patent is:

1. In an internal combustion engine of the two-stroke cycle type comprising a crank-shaft, a connecting rod, a big end bearing on the connecting rod engaging the crank-shaft, and a lubricant passage in the crank-shaft for connecting the big end bearing with lubricant supply means, the combination of a plunger slidable radially in the crank-shaft for blocking said lubricant passage, said plunger having a reduced portion between its ends, and cam means engaging said plunger for operating it to align the reduced portion of the plunger with said lubricant passage.

2. In an internal combustion engine of the two-stroke cycle type comprising a crank-shaft, a connecting rod, a big end bearing on the connecting rod engaging the crank shaft, and a lubricant passage in the crank shaft for connecting the big end bearing with lubricant supply means, the combination of a plunger slidable radially in the crank-shaft tranversely of the lubricant passage therein for blocking said lubricant passage, said plunger having a reduced portion between its ends, and a fixed internal cam through which the crank-shaft extends for reciprocating said plunger and having a contour to align the reduced portion of the plunger with said lubricant passage during part of a revolution of the crank-shaft.

3. In an internal combustion engine of the two-stroke cycle crank-case compression type comprising a crank-case, a crank-shaft and a crank thereon enclosed in the crank-case, a connecting rod for a reciprocating piston operative to compress gases in the crank-case, a big end bearing on the connecting rod engaging the crank on the crank-shaft, and a lubricant passage in the crank-shaft for connecting the big end bearing with lubricant supply means, the combination of a plunger slidable radially in the crank-shaft transversely of the lubricant passage therein for blocking said passage and having a portion of reduced diameter between its ends, and a fixed internal cam engaging the ends of said plunger for reciprocating it, said cam having a contour to align the portion of the plunger of reduced diameter with said lubricant passage when the piston is at the end of its stroke which compresses gases in the crank-case.

References Cited in the file of this patent

UNITED STATES PATENTS

| 946,133 | Jahnke | Jan. 11, 1910 |

FOREIGN PATENTS

| 145,885 | Great Britain | July 2, 1920 |